(12) United States Patent
Boivie et al.

(10) Patent No.: US 8,954,752 B2
(45) Date of Patent: Feb. 10, 2015

(54) BUILDING AND DISTRIBUTING SECURE OBJECT SOFTWARE

(75) Inventors: Richard Harold Boivie, Hawthorne, NY (US); Peter T. Williams, Hawthorne, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/033,455

(22) Filed: Feb. 23, 2011

(65) Prior Publication Data

US 2012/0216051 A1  Aug. 23, 2012

(51) Int. Cl.
 *G06F 11/30* (2006.01)
 *G06F 12/14* (2006.01)
 (Continued)

(52) U.S. Cl.
 CPC .......... *G06F 21/6209* (2013.01); *G06F 21/125* (2013.01); *G06F 21/121* (2013.01); *H04L 63/0428* (2013.01); *G06F 12/1425* (2013.01); *G06F 21/12* (2013.01); *H04L 9/0825* (2013.01); *H04L 9/08* (2013.01); *G06F 21/62* (2013.01)
 USPC ............... 713/190; 380/28; 380/30; 380/201; 380/278; 380/282; 713/164; 713/185

(58) Field of Classification Search
 CPC ..... G06F 21/00; G06F 21/62; G06F 21/6209; G06F 21/12; G06F 21/121; G06F 21/125; H04L 9/00; H04L 9/08; H04L 9/0825; H04L 63/0428
 USPC .............. 713/164–167, 185–194; 380/28, 30, 380/201, 278, 282, 285
 See application file for complete search history.

(56) References Cited

U.S. PATENT DOCUMENTS 5,222,139 A   6/1993   Takaragi et al.
5,481,613 A   1/1996   Ford et al.
(Continued)

FOREIGN PATENT DOCUMENTS

CN   1309351 A      8/2001
JP   H 07287514 A   10/1995
(Continued)

OTHER PUBLICATIONS

Frincke, D.; "Developing Secure Objects"; Google; 1995-1996.
(Continued)

*Primary Examiner* — Jeffrey Pwu
*Assistant Examiner* — Jayesh Jhaveri
(74) *Attorney, Agent, or Firm* — Anne V. Dougherty, Esq.; McGinn IP Law Group, PLLC

(57) ABSTRACT

A method and structure for enhancing protection for at least one of software and data being executed on a computer. A file to comprise a secure object is constructed, using a processor on a build machine, the secure object to be executed on a target machine different from the build machine. The secure object comprises at least one of code and data that is to be encrypted when the secure object is stored on the target machine. The encrypted stored secure object is decrypted by the target machine when executed by the target machine after retrieval from a memory on the target machine. The decryption uses a system key of the target machine. The secure object is stored, upon completion of construction, in an encrypted state as a completed secure object, and the secure object is completed without the build machine having the system key of the target machine.

22 Claims, 9 Drawing Sheets

(51) Int. Cl.
*G06F 21/62* (2013.01)
*G06F 21/12* (2013.01)
*H04L 29/06* (2006.01)
*H04L 9/08* (2006.01)

(56) References Cited

U.S. PATENT DOCUMENTS

| | | | |
|---|---|---|---|
| 5,615,263 | A | 3/1997 | Takahashi |
| 5,748,782 | A | 5/1998 | Ferreira et al. |
| 5,845,281 | A | 12/1998 | Benson et al. |
| 6,185,685 | B1 | 2/2001 | Morgan et al. |
| 6,397,331 | B1 | 5/2002 | Ober et al. |
| 6,523,118 | B1 | 2/2003 | Buer |
| 6,704,871 | B1 | 3/2004 | Kaplan et al. |
| 6,708,273 | B1 | 3/2004 | Ober et al. |
| 6,751,709 | B2 | 6/2004 | Seidl et al. |
| 6,968,420 | B1 | 11/2005 | Giles et al. |
| 7,043,616 | B1 | 5/2006 | McGrath |
| 7,055,040 | B2 * | 5/2006 | Klemba et al. ............... 713/156 |
| 7,136,488 | B2 | 11/2006 | Hashimoto et al. |
| 7,167,956 | B1 | 1/2007 | Wright et al. |
| 7,249,225 | B1 | 7/2007 | Seidl et al. |
| 7,260,726 | B1 | 8/2007 | Doe et al. |
| 7,290,288 | B2 | 10/2007 | Gregg et al. |
| 7,483,930 | B1 | 1/2009 | Wright et al. |
| 7,516,331 | B2 | 4/2009 | Jin et al. |
| 7,747,877 | B2 | 6/2010 | Jin et al. |
| 7,865,733 | B2 | 1/2011 | Goto et al. |
| 7,933,413 | B2 | 4/2011 | Steeves et al. |
| 8,041,947 | B2 | 10/2011 | O'Brien et al. |
| 8,055,910 | B2 | 11/2011 | Kocher et al. |
| 8,086,871 | B2 | 12/2011 | McIntosh et al. |
| 8,108,641 | B2 | 1/2012 | Goss et al. |
| 8,392,725 | B2 | 3/2013 | McIntosh et al. |
| 8,464,011 | B2 | 6/2013 | Krig |
| 8,572,400 | B2 * | 10/2013 | Lin et al. ............... 713/189 |
| 2001/0010722 | A1 | 8/2001 | Enari |
| 2001/0014157 | A1 | 8/2001 | Hashimoto et al. |
| 2001/0050990 | A1 | 12/2001 | Sudia |
| 2002/0064283 | A1 | 5/2002 | Parenty |
| 2002/0172368 | A1 | 11/2002 | Peterka |
| 2004/0039926 | A1 * | 2/2004 | Lambert ............... 713/189 |
| 2004/0123127 | A1 | 6/2004 | Teicher et al. |
| 2004/0139346 | A1 | 7/2004 | Watt et al. |
| 2004/0181303 | A1 | 9/2004 | Walmsley |
| 2005/0038998 | A1 | 2/2005 | Ueno et al. |
| 2005/0044390 | A1 | 2/2005 | Trostle |
| 2005/0076226 | A1 * | 4/2005 | Boivie et al. ............... 713/187 |
| 2005/0105738 | A1 | 5/2005 | Hashimoto |
| 2005/0166069 | A1 | 7/2005 | Hashimoto et al. |
| 2005/0177742 | A1 | 8/2005 | Benson et al. |
| 2006/0106801 | A1 * | 5/2006 | Cox et al. ............... 707/9 |
| 2006/0156418 | A1 | 7/2006 | Polozoff |
| 2006/0242611 | A1 | 10/2006 | Drake |
| 2007/0047735 | A1 * | 3/2007 | Celli et al. ............... 380/30 |
| 2007/0101124 | A1 | 5/2007 | Pitts |
| 2007/0133795 | A1 * | 6/2007 | Kahn et al. ............... 380/201 |
| 2008/0072068 | A1 | 3/2008 | Wang et al. |
| 2008/0109903 | A1 | 5/2008 | Werner et al. |
| 2008/0155273 | A1 | 6/2008 | Conti |
| 2008/0205651 | A1 | 8/2008 | Goto et al. |
| 2008/0222420 | A1 * | 9/2008 | Serret-Avila ............... 713/176 |
| 2008/0270806 | A1 | 10/2008 | Nakamura |
| 2008/0282093 | A1 | 11/2008 | Hatakeyama |
| 2008/0288786 | A1 | 11/2008 | Fiske |
| 2008/0301441 | A1 | 12/2008 | Calman et al. |
| 2009/0006796 | A1 | 1/2009 | Chang et al. |
| 2009/0006864 | A1 | 1/2009 | Hashimoto et al. |
| 2009/0217385 | A1 | 8/2009 | Teow et al. |
| 2009/0259857 | A1 | 10/2009 | Gehrmann |
| 2009/0300366 | A1 | 12/2009 | Gueller et al. |
| 2009/0319782 | A1 | 12/2009 | Lee |
| 2010/0031061 | A1 | 2/2010 | Watanabe et al. |
| 2010/0119068 | A1 | 5/2010 | Harris |
| 2010/0153746 | A1 | 6/2010 | Takeuchi et al. |
| 2010/0161904 | A1 | 6/2010 | Cypher et al. |
| 2010/0262824 | A1 * | 10/2010 | Keshavachar et al. ........ 713/168 |
| 2010/0281273 | A1 | 11/2010 | Lee et al. |
| 2011/0064217 | A1 | 3/2011 | Fry et al. |

FOREIGN PATENT DOCUMENTS

| | | |
|---|---|---|
| JP | 2001-230770 A | 8/2001 |
| JP | 2001-318787 A | 11/2001 |
| JP | 2002-232417 A | 8/2002 |
| JP | 2006-018528 A | 1/2006 |
| JP | 2006-209703 A | 8/2006 |
| JP | 2006-227777 | 8/2006 |
| JP | 2006-309766 A | 11/2006 |
| JP | 2007-514994 A | 6/2007 |
| JP | 2007-233426 A | 9/2007 |
| JP | 2008-210225 A | 9/2008 |
| TW | 200822068 A | 5/2008 |
| TW | 200841682 A | 10/2008 |
| WO | WO 98/54633 A1 | 12/1998 |
| WO | WO 2005-096120 A1 | 10/2005 |
| WO | WO-2008003833 A1 | 1/2008 |

OTHER PUBLICATIONS

Somogyi, et al.; :NbIDL: Secure, Object-oriented, Client-Server Middleware ; Google; 1998.

SAP Functions in Detail-; "Crystal Reports Server—A Functional Overview"; Google; 2008.

PCT Notification Concerning Transmittal of International Preliminary Report on Patentability dated Jan. 12, 2012. (PCT Application No. PCT/US2010/001811).

United States Office Action dated Mar. 26, 2012 in U.S. Appl. No. 12/492,738.

Henry Levy, Capability-Based Computer Systems, Published by Digital Press 1984. http://www.cs.washington.edu/homes/levy/capabook.

Theodore A. Linden, Operating System Structure to Support Security and Reliable Software, Institute for Computer Sciences and Technology, National Bureau of Standards, Washington, DC 20234 http://delivery.acm.org/10.1145/360000/356682/P409.linden.pdf—Abstract Only ACM Computing Survey (CSUR), vol. 8, Issue 4, Dec. 1976.

Canetti, et al., "A Two Layers Approach for Securing an Object Store Network", Proceedings of the First International IEEE Security in Storage Work-Shop (2002) (SISW'02), 1-14.

Wang, et al., "Keep Passwords Away from Memory: Password Caching and Verification Using TPM", 22$^{nd}$ International Conference on Advanced Information Networking and Applications, IEEE, 755-762, DOI: 10.1109/AINA, 2008.109.

Catrein, et al. "Private Domains in Networks of Information", IEEE International Conference Communications (ICC) Work-Shops, 2009.1-5.

PCT Notification of Transmittal of the International Search Report and the Written Opinion of the International Searching Authority, or the Declaration dated Oct. 1, 2010.

Williams, et al., "CPU Support for Secure Executables", The 4$^{th}$ International Conference on Trust and Trustworthy Computing, Jun. 22-24, 2011, Pittsburgh, PA.

Williams, et al., "CPU Support for Secure Executables" Stony Brook University, Power Point Presentation at the 4$^{th}$ International Conference on Trust and Trustworthy Computing, Jun. 22-24, 2011, Pittsburgh, PA.

United States Office Action dated Mar. 25, 2013 in U.S. Appl. No. 13/033,367.

United States Office Action dated Mar. 18, 2013 in U.S. Appl. No. 12/878,696.

Combined Search and Examination Report dated Dec. 20, 2012.

United States Office Action dated Jun. 5, 2013 in U.S. Appl. No. 12/492,738.

(56) References Cited

OTHER PUBLICATIONS

United States Office Action dated Nov. 9, 2012 in U.S. Appl. No. 13/033,367.
United States Office Action dated Aug. 14, 2013 in U.S. Appl. No. 13/226,079.
United States Office Action dated Aug. 14, 2013 in U.S. Appl. No. 12/492,738.
United States Notice of Allowance dated Jul. 23, 2013 in U.S. Appl. No. 13/033,367.
Haifeng, et al. "Memory Confidentiality and Integrity Protection Method Based on Variable Length Counter", 2012, IEEE, p. 290-294.
United States Notice of Allowance dated May 5, 2014 in U.S. Appl. No. 12/492,738.
Suh, et al., "Efficient Memory Integrity Verification and Encryption for Secure Processors", $36^{th}$ International Symposium on Microarchitecture, 2003 IEEE, pp. 1-12.
Yang, et al., "Fast Secure Processor for Inhibiting Software Piracy and Tampering", $36^{th}$ International Symposium to Microarchitecuture, 2003 IEEE, pp. 1-10.
United States Office Action dated Oct. 4, 2013 in U.S. Appl. No. 12/878,696.
United States Office Action dated Feb. 12, 2014 in U.S. Appl. No. 12/492,738.
United States Office Action dated Mar. 19, 2014 in U.S. Appl. No. 13/226,079.
U.S. Office Action dated May 30, 2014 in co-pending U.S. Appl. No. 14/017,555.

* cited by examiner

BUILDING AND DISTRIBUTING SECURE OBJECT SOFTWARE

BACKGROUND OF THE INVENTION

1. Cross-Reference to Related Applications

The present application is related to the following co-pending applications:

U.S. patent application Ser. No. 12/492,738, filed on Jun. 26, 2009, to Richard H. Boivie, entitled "SUPPORT FOR SECURE OBJECTS IN A COMPUTER SYSTEM", and U.S. patent application Ser. No. 12/878,696, filed on Sep. 9, 2010, to Richard H. Boivie, entitled "CACHE STRUCTURE FOR A COMPUTER SYSTEM PROVIDING SUPPORT FOR SECURE OBJECTS", both of which are incorporated herein by reference.

The present Application is also related to U.S. patent application Ser. No. 13/033,367, to Boivie, et al., entitled "SECURE OBJECT HAVING PROTECTED REGION, INTEGRITY TREE, AND UNPROTECTED REGION", filed concurrently herewith.

2. Field of the Invention

The present invention generally relates to security on a computer. More specifically, in a system based on secure objects that protect software code and data from other software within a system, a method for constructing such secure objects permits a build machine to construct a secure object for a target machine without having the target machine's system key that is used in decrypting the secure object for execution on the target machine.

3. Description of the Related Art

The first co-pending patent application introduced the concept of a 'Secure Object' comprising code and data for a computer system that is cryptographically protected from other software on the system, and a computer architecture for supporting such Secure Objects. The co-pending patent application also defined the notion of a handle for a Secure Object containing information that is specific to the Secure Object that is encrypted under the 'System Key' of the system on which the Secure Object will run. The co-pending patent application additionally described a method for building and distributing Secure Object-based software with these encrypted handles.

FIG. 1 shows the system 100 described in this co-pending application, in which a crypto engine 102 associated with a microprocessor 101 decrypts an encrypted secure object retrieved from memory 103 by the CPU 104 for execution of the secure object. When Secure Object information is returned to memory, the secure object information is again encrypted by the crypto engine 102 prior to storage in memory 103. The decryption/encryption in the crypto engine 102 uses keys 105 retrieved from a protected area 106 in the CPU 104.

In the method described in the co-pending application, the machine on which the software is built, i.e., the build machine, 'knows' the System Key of the target machine, meaning that the System Key of the target machine has been stored in the build machine, and encrypts Secure Object handles under that System Key. This method has two disadvantages. First, it requires the build machine to know the System Key of the target machine—which is not desirable. Second, it implies that either all the target machines must have the same system key or the build machine must send a slightly different version of the Secure Object-based software to each of the target machines.

The present inventors have recognized that a need exists to improve the method of enhancing security on a computer using the previously-described secure object mechanism and, more particularly, the need to securely permit one machine, the "build machine", to construct a secure object for another machine, the "target machine" in such a way that the build machine does not need to know the System Key of the target machine.

SUMMARY OF THE INVENTION

In view of the foregoing, and other, exemplary problems, drawbacks, and disadvantages of the conventional systems, the present application describes an improved method for building and distributing Secure Object-based software that overcomes these disadvantages.

In a first exemplary aspect, described herein is a method of enhancing protection for at least one of software and data being executed on a computer, including constructing, using a processor on a build machine, a file to comprise a secure object to execute on a target machine different from the build machine, the secure object comprising at least one of code and data that is to be encrypted when the secure object is stored on the target machine, the secure object to be decrypted by the target machine when executed by the target machine from memory on the target machine, the decryption using a system key of the target machine; and storing the secure object in an encrypted state as a completed secure object, wherein the secure object is completed without the build machine having the system key of the target machine.

In a second exemplary aspect, also described herein is an apparatus serving as a build machine for a secure object, the apparatus including a processor for constructing a file to comprise a secure object to execute on a target machine different from the build machine; wherein the secure object comprises at least one of code and data that is to be encrypted when the secure object is stored on the target machine, the encrypted stored secure object to be decrypted by the target machine when executed by the target machine after retrieval from a memory on the target machine, the decryption using a system key of the target machine, wherein the secure object is stored on the target machine, upon completion of construction, in an encrypted state as a completed secure object, and wherein the secure object is completed without the build machine having the system key of the target machine.

In a third exemplary aspect, also described herein is an apparatus serving as a target machine for executing a secure object constructed by a build machine different from said target machine, the apparatus including a processor serving to execute said secure object constructed on the build machine, the secure object comprising at least one of code and data that is to be encrypted when the secure object is stored on the target machine, the encrypted stored secure object to be decrypted by the target machine when executed by the target machine after retrieval from a memory on the target machine, the decryption using a system key of the target machine, wherein the secure object is completed without the build machine having the system key of the target machine.

Thus, the present invention provides mechanisms in which computer security is enhanced by permitting a build machine to construct secure objects for a target machine without having the target machine's system key that is used in decrypting the secure object for execution on the target machine.

BRIEF DESCRIPTION OF THE DRAWINGS

The foregoing and other purposes, aspects and advantages will be better understood from the following detailed description of an exemplary embodiment of the invention with reference to the drawings, in which.

EXEMPLARY EMBODIMENTS OF THE INVENTION

Figure 1:
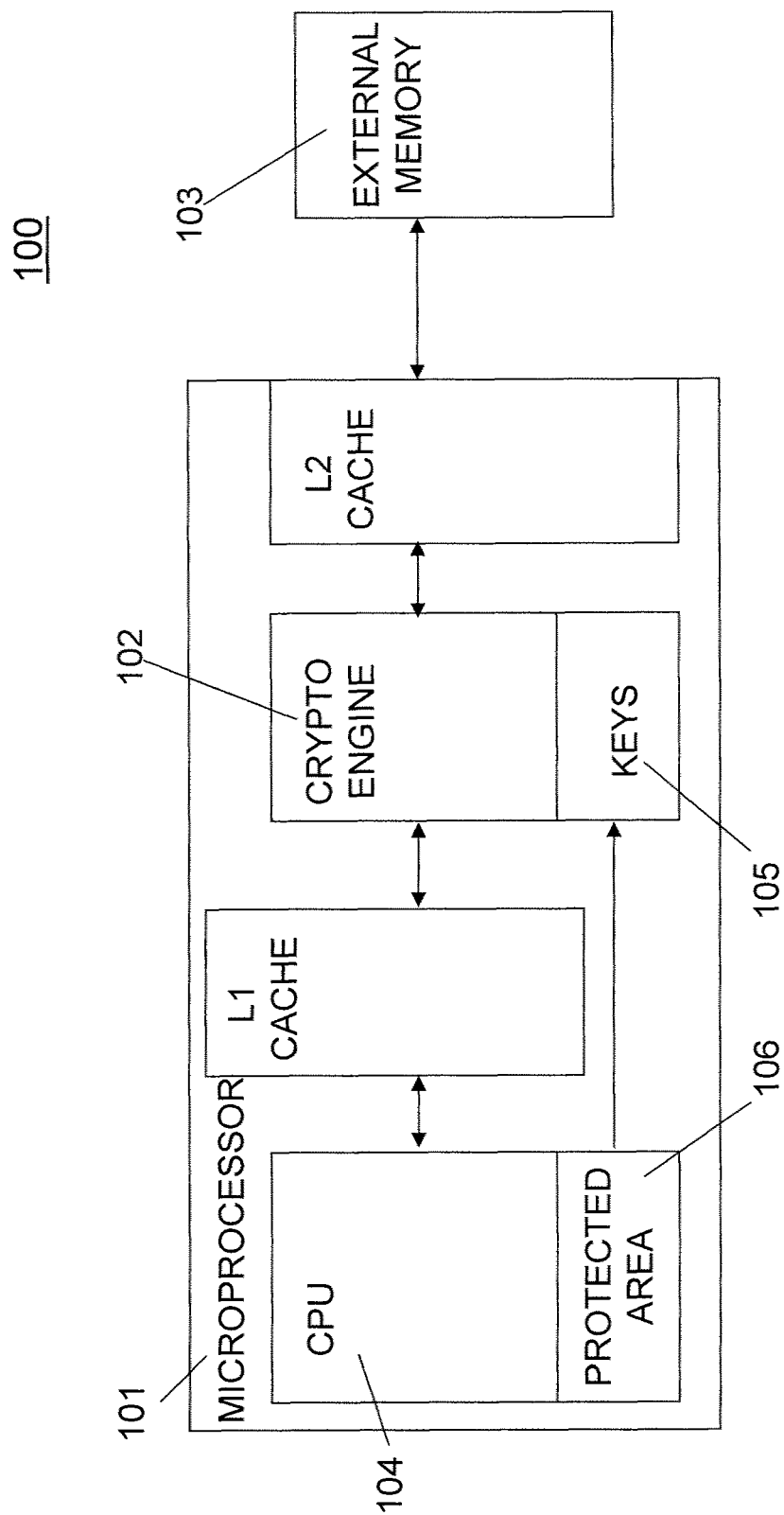
FIG. 1 shows exemplarily the concept 100 of secure objects.

Referring now to the drawings, and more particularly to FIGS. 1-11, exemplary embodiments of the method and structures of the present invention will now be described.

In the improved method described by the present application, the build machine does not know the System key of the target machine(s).

Rather, in a first exemplary embodiment, the improved method makes use of a special Deployment Server (DS) process on the target machine. The DS will be a Secure Object-based secure process that protects sensitive information including the System Key of the target machine and the Secure Object-based software that it receives from the build machine. The build machine will securely send the software to the DS process via standard communications security mechanisms, such as SSL (Secure Sockets Layer) or TLS (Transport Layer Security) that provide cryptographic protection for network communications. The DS will then generate an encryption key for each of the Secure Objects in the received software and encrypt each Secure Object under its key. The handle for each Secure Object including the object's encryption key will then be encrypted under the System Key.

In this way, the received Secure Object-based software will be protected by the communications security mechanisms until it is safely inside the DS Secure Object-based secure process and it will be protected by the DS secure process until the Secure Objects and handles have been encrypted. Once the Secure Objects and handles have been encrypted, the Secure Object-based software can be safely installed in the file system. Thus the Secure Object-based software is always protected from the time it leaves the build machine until it is safely installed in the file system on the target machine with no point of vulnerability anywhere along the way. Note that the DS could also use digital certificates and/or public keys to validate a digital signature on received software to ensure that any software received is from a legitimate trusted party. Since the DS process is itself a Secure Object-based secure process, the integrity of these digital certificates and public keys would be protected from tampering.

The DS process itself will be built and installed on a system at "system build time", in a secure environment where the system is not subject to physical or software attack.

In this secure environment:
the system is manufactured;
it is loaded with standard (cleartext) software including OS, middleware, applications, etc.;
the DS process is compiled and linked; and
then encrypted and installed as discussed below.
An encryption key is generated for the DS Secure Object and the DS Secure Object is encrypted under this encryption key.
A system key is generated for the new system.
This key is written into the system's 'System Key' register, which is not accessible by software but which is used by the CPU hardware in the processing of an esm instruction. (At run-time the esm instruction will be used to 'Enter Secure Mode.' As discussed in the co-pending patent application, the esm instruction enables a Secure Object's sensitive information to be decrypted on the path from external memory into the CPU and encrypted on the path from CPU to external memory.)
This System Key is also used to encrypt the handles in the DS process.
Once the handles are encrypted under the System Key, the DS code can be installed on the system
and the system can be shipped,
and then installed and run in the desired run-time environment.
Additional Secure Object-based software can then be sent to the system's DS process and installed by the DS as discussed previously.

Thus, in the first exemplary embodiment, the build machine does not know the System key of the target machine, and does not need to know this System key, because it is the target machine that actually completes the construction of the Secure Object that was originated by the build machine.

In an alternative design, an exemplary second embodiment, conventional public key cryptography can be used to encrypt and decrypt Secure Object handles In this design, the system key that the target machine uses to decrypt the handle (esm operand) is the private key of a public key pair and the build machine encrypts the handle/esm operand with the corresponding public key. In this alternative design, the build machine does not need to know the target machine's system key and the DS process can be eliminated but the build machine must send a slightly different executable to each of the target machines. In this exemplary design, the build machine:

1. chooses the Secure Object keys,
2. encrypts Secure Objects under those keys,
3. uses the public key of the target machine to encrypt Secure Object handles, and
4. sends the Secure Object-based software to the target machine.

At execution time on the target machine, in the processing of an esm instruction, the CPU hardware decrypts the handle (the operand of the esm instruction) using the private key of the target machine which it obtains from the 'System Key' register. The private key is installed on the target machine at "system build time" in a secure environment when the system is manufactured.

In either the design of the first exemplary embodiment or the second exemplary embodiment, the System Key register is writeable but not readable by software. Since a write to the System Key register can make existing Secure Object software unusable, the operation could be limited to a small amount of trusted software such as software that knows the current value of the System Key, such as the DS process discussed above. The instruction for writing the System Key register might take two operands: one for the current value of the System Key and one for the new value. The write operation would only succeed if the first operand matches the current value stored in the System Key register.

It is further noted that in either the first or second exemplary embodiments, when the build machine builds secure object software for a target machine, the building is done in a secure environment, meaning that the both the secure object under construction and the construction process itself are not subject to physical or software attack.

Figure 2:
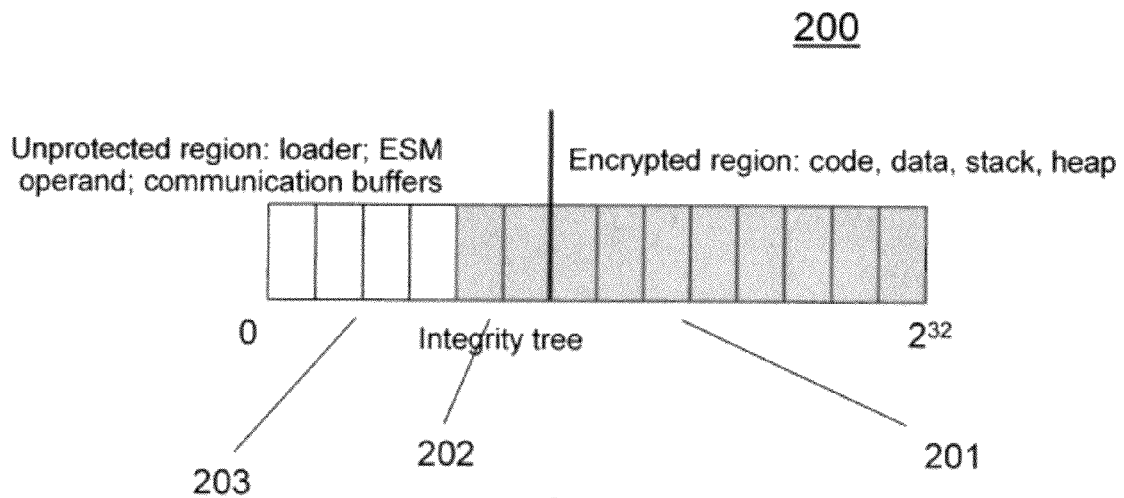
FIG. 2 shows exemplarily a format and content 200 for an executable file that includes secure object-based software.

To further clarify the exemplary methods of the present invention, FIG. 2 illustrates an exemplary format of an executable file 200 that includes Secure Object-based software. The file contains (1) the Secure Object code and data in encrypted form 201, (2) the initial version of an integrity tree 202 that will be used at run-time to protect the integrity of the Secure Object's code and data, and (3) loader code including an esm instruction (in 203) to 'Enter Secure Mode'. As discussed in the first co-pending patent application above, the esm instruction allows a Secure Object's sensitive information to be decrypted on the path from external memory into the CPU and encrypted on the path from CPU to external memory.

FIG. 2 also shows communication buffers in the unprotected region 203. These will be discussed in more detail below. Thus, in FIG. 2, the unshaded region 203 of the binary file is an unprotected region that includes a loader, the esm instruction including the esm operand (or handle), and communication buffers. The shaded regions include the integrity tree 202 and the encrypted region 201 that includes one or more of code, data, stack, and heap data. This file might be in a standard executable format, such as ELF. The code and data are encrypted so that only the target CPU can read the binary, and only in secure mode.

The binary file for the secure object contains the encrypted code and data 201 of the secure object, the initial integrity tree 202, and the unprotected region 203 including communication buffers, the loader code and the esm instruction that will be used to enter secure mode at run-time.

Figure 3:
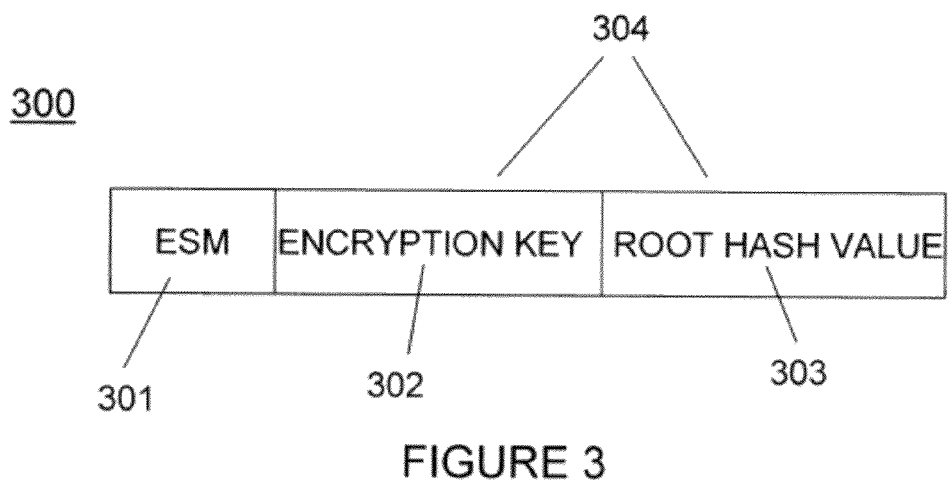
FIG. 3 shows an exemplary implementation 300 of the esm instruction.

FIG. 3 illustrates an exemplary implementation of the esm instruction 300 that is used to enter secure mode. The esm instruction has an operand 304 that includes in encrypted form the encryption key 302 that is used to decrypt and encrypt Secure Object code and data as that information moves between the CPU and external memory and the initial value 303 of the root of the hash tree that protects the integrity of the Secure Object code and data. At run-time, this operand is decrypted using the System Key of the target machine. In the first design discussed above, the System Key is a secret key. In the alternative design discussed above, the System Key is the private key of a public key pair.

Thus, the esm instruction 300 loads the encryption key used for decryption/encryption of the secure object, loads the root hash value that will be used with the hash tree in the cleartext region to protect the integrity of the secure object. The esm instruction also assigns an object ID ("OID") that the CPU and the operating system can use to refer to this secure object as discussed below.

It is noted that the protection of integrity using the hash tree approach is further discussed in a co-pending application, U.S. patent application Ser. No. 10/677,933, to R. H. Boivie and W. E. Hall, entitled "Computing Device That Securely Runs Authorized Software", filed on Oct. 1, 2003, published Apr. 7, 2005, as US Patent Publication No. 2005/0076226, that is referred to in the first above-identified co-pending application. Contents of this co-pending application are also incorporated herein by reference.

Figure 4:
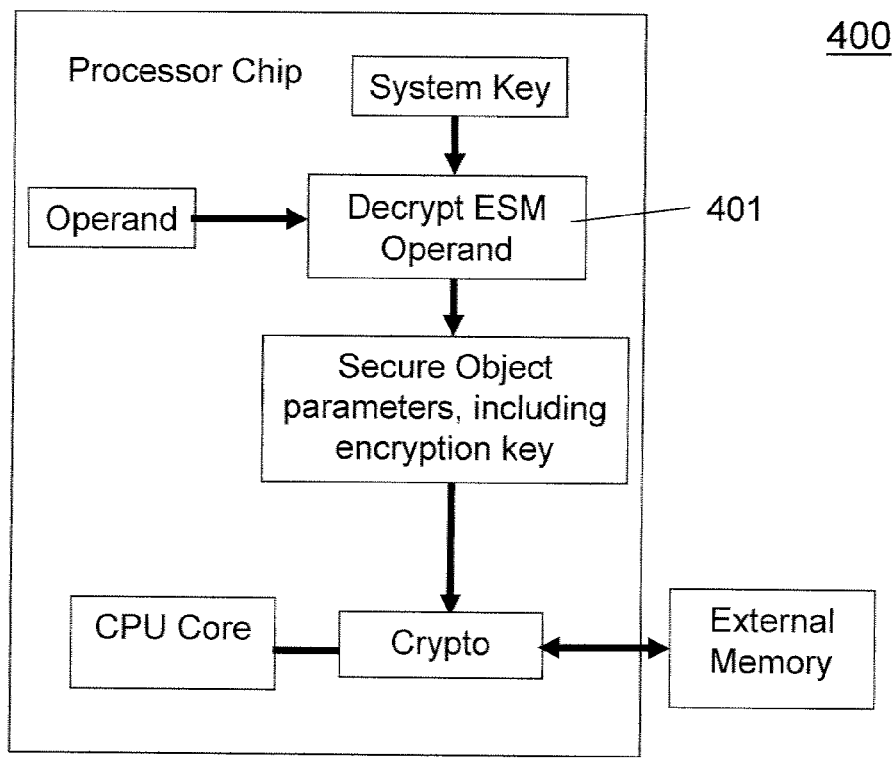
FIG. 4 shows an exemplary operation 400 of the esm instruction.

FIG. 4 illustrates the processing 400 that occurs during execution of the esm instruction, used to enter secure mode and load crypto keys. The secure object's keys are not "in the clear" in its esm instructions. Rather, as shown in step 401, the esm operand (or handle) is decrypted under the System Key, which, as discussed above may be a secret key or the private key of a public key pair. This decryption produces several Secure Object parameters including the encryption key for the Secure Object's code and data and the initial root of the hash tree. As noted in the figure, other software does not have access to the System Key and cannot decrypt the esm operand. And other software cannot use the Secure Object's operand without generating an integrity exception since the integrity tree ensures that only the unmodified Secure Object software can use that operand.

The esm instruction also allocates an Object-ID for the Secure Object and loads this value into an Object-ID register. This register stores the Object-ID of the currently running Secure Object or a special value, such as 0, if non-Secure Object code is running. The Object-ID is used by the CPU hardware e.g. to identify the owner of a cache line as discussed in the second co-pending patent application above, U.S. patent application Ser. No. 12/878,696, filed on Sep. 9, 2010, to Richard H. Boivie, entitled "CACHE STRUCTURE FOR A COMPUTER SYSTEM PROVIDING SUPPORT FOR SECURE OBJECTS". The Object-ID is also used by the operating system to refer to a (e.g., to run) a Secure Object.

Figure 5:
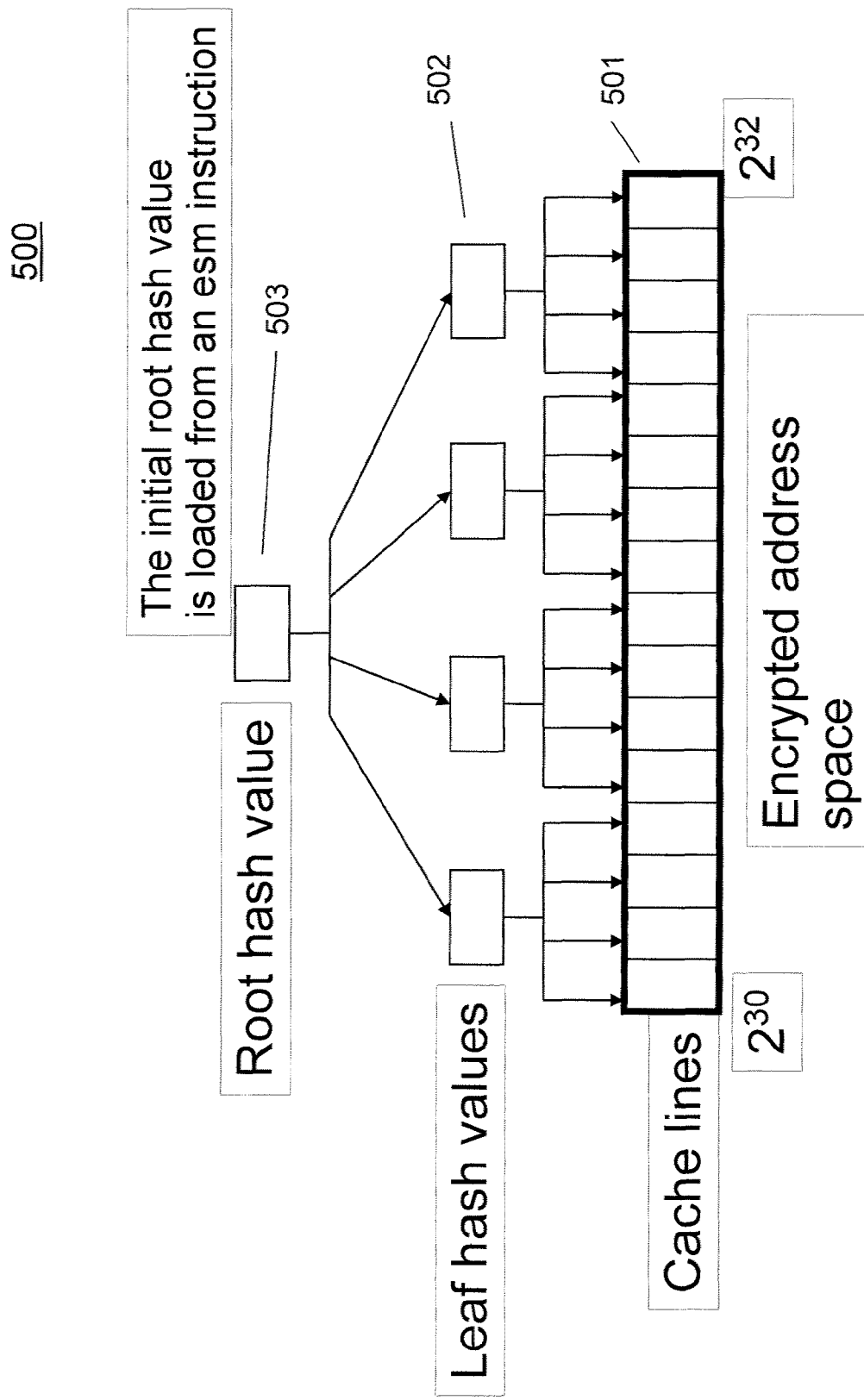
FIG. 5 shows exemplarily a hash tree 500 used to protect the integrity of a secure object's code and data.

FIG. 5 illustrates the hash tree that is used to protect the integrity of a Secure Object's code and data.

At the bottom 501 of the tree is the protected region of the Secure Object's address space, i.e., the portion of the address space that is cryptographically protected in FIG. 2. The protected region 501 is divided up into cache line size chunks and each of these chunks is protected by a hash value 502. These hash values 502 are, in turn, protected by other hash values and so on, up to a single root hash value 503.

Figure 6:
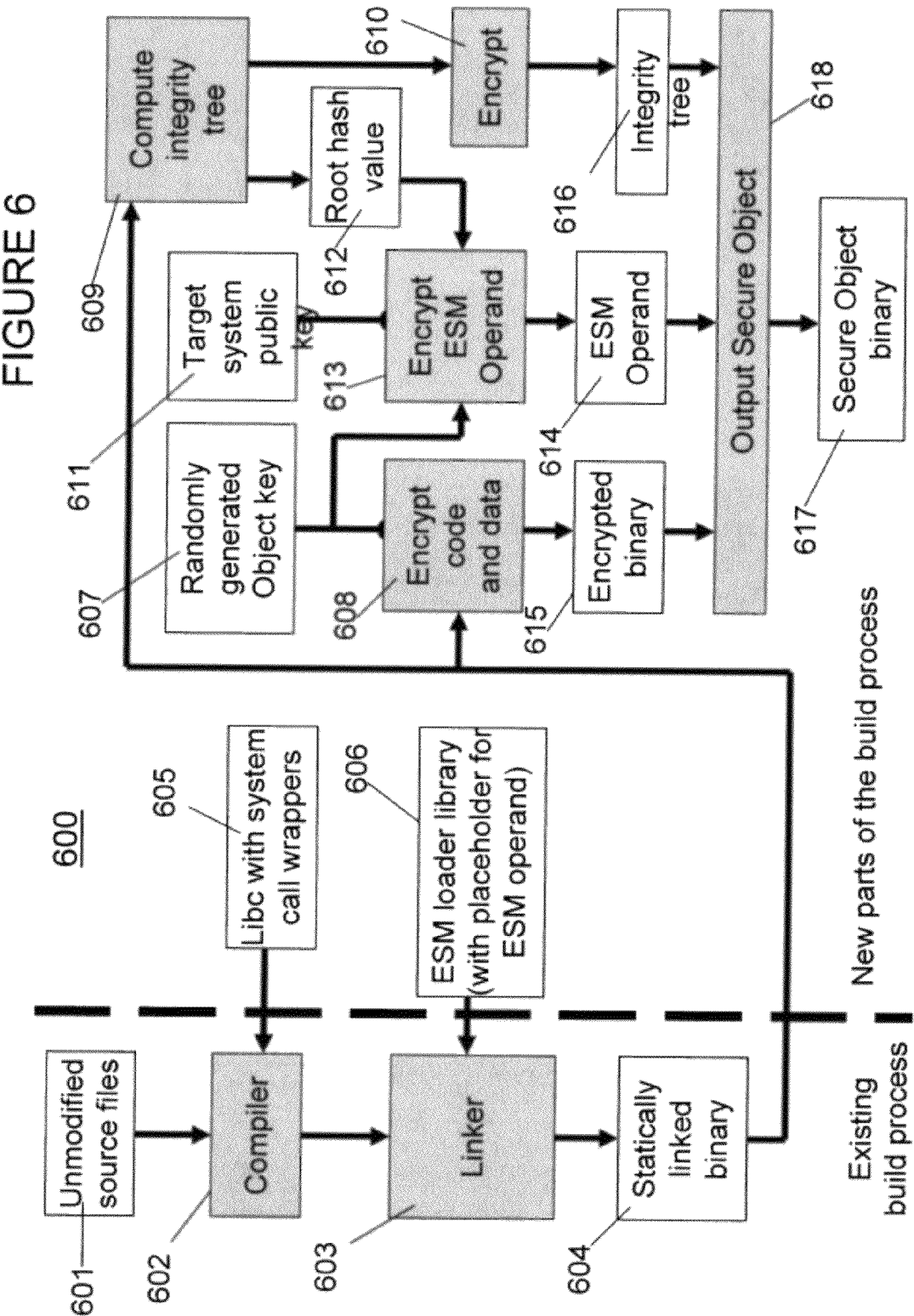
FIG. 6 shows an exemplary process 600 of building secure objects in accordance with a second exemplary embodiment of the present invention.

The initial values of the hash tree are computed at software build time, which is discussed in more detail in the discussion of FIG. 6. At execution time, the values from leaf to root are checked when a cache line size chunk is loaded into the cache from external memory. This checking ensures that no tampering has occurred. If the check detects an inconsistency, an integrity exception is generated.

When a dirty cache line is evicted from the cache, the values from leaf to root are updated appropriately. Although an adversary or malware may be able to store arbitrary values into the lower portions of the hash tree, the root of the tree is stored inside the CPU chip, where it is not subject to tampering. This method prevents an adversary from undetectably changing the memory (code or data) of a Secure Object. The initial root value is loaded into the CPU in the execution of an esm instruction (discussed in FIGS. 3 and 4) and the root value is saved and restored by the CPU hardware in a process context switch. Context switching and interrupt handling are discussed in more detail below.

Information in the cache is also protected, for example, by the method discussed in co-pending U.S. patent application Ser. No. 12/878,696, by Richard H. Boivie, entitled "Cache Structure For a Computer System Providing Support For Secure Objects", filed Sep. 9, 2010, and also incorporated herein by reference.

Since information in the cache cannot be tampered with, as discussed in the co-pending patent application, values in the cache can be trusted. Hash values need only be checked when a cache line moves from external memory into the cache and hash values need only be updated when a cache line moves from the cache to external memory. As discussed in co-pending application Ser. No. 12/878,696, cryptographic overhead can be minimized by storing values in on-chip caches in the clear and only performing decryption or encryption when information moves between the on-chip caches and external memory. Since crypto overhead as well as hash value integrity overhead only occurs when information moves between on-chip caches and external memory, as long as a Secure Object is getting cache hits, the performance overhead is zero.

Furthermore, since information in the cache is protected and can be assumed to be correct, when a cache line is brought into the cache, the checking of hash values on the path from leaf to root need only continue until a node is reached that is already in the cache.

Similarly, when a cache line is evicted, only its parent hash value needs to be updated if (or once) that value is in the cache.

Note that separate encryption keys and separate hash trees could be used to protect code and data. This would enable multiple executing instances of a given program to share code without sharing data. And, since compiled code is read-only and replay attacks (in which an adversary "replays" information that was previously valid but is not currently valid) are not an issue, the "hash tree" for protecting code could consist of a single level of hash values. Thus, at most, a single hash value would need to be checked when a cache line of code is brought into the cache and, since code is read-only, code hash values would never be updated at run-time or written back from the cache to external memory. The hash value for a code cache line would include some identification of the program that it belongs to as well as its virtual address to prevent relocation or "code-swapping" attacks.

As stated above, the data might be protected by an encryption key and a hash tree that are distinct from those used for the code. This might involve a data key that is generated at run-time and an additional "loader" in the protected code region that copies initialized data values from a region of memory protected by the code key to a region protected by the data key.

As mentioned above, FIG. 2 shows communication buffers in the unprotected region 203. These buffers, which are not protected by the Secure Object encryption, are used when information is to be passed to or received from another entity, such as a remote system, that does not have access to the Secure Object encryption key. Since these buffers are not protected by the Secure Object encryption, when this information is sent to a remote system, the remote system can "see" the same information that the Secure Object "sees". If the contents of a buffer were encrypted under the Secure Object encryption, a remote system receiving those contents would not be able to "see" the content that the Secure Object "sees".

Since the CPU decrypts information that moves from a protected region in external memory into the CPU and since the CPU does not encrypt information that moves from the CPU to an unprotected region in external memory, the act of copying information from the protected region to the unprotected region has the effect of decrypting the information. Information in this region can be sent to a remote system and the remote system will be able to read it.

Similarly the act of copying information from the unprotected region to the protected region has the effect of encrypting it under the Secure Object encryption key. This is useful when information is received from a remote entity.

Note that, although the unprotected region is not protected by the Secure Object encryption mechanism, information in that region can still be cryptographically protected. Standard communication mechanisms such as SSL or TLS can be used to provide end-to-end security. If, for example, a message that is to be sent to a remote system is encrypted under TLS before it is moved to the unprotected region, the message will be protected in the unprotected region by the same mechanism that protects it while the message is "in transit" traveling across a network.

If, at the receiving end, the message is moved to the protected region before the TLS decryption, the message will have strong protection end-to-end with no point of vulnerability along the way.

The keys that a Secure Object uses for TLS or other communications security (or for storing information securely in a file system) will be protected inside the Secure Object so other software including the operating system will not be able to access those keys or undetectably tamper with them.

System call "wrappers" can be linked with Secure Object software so that the Secure Object software does not need to know about the protected and unprotected regions. These "wrappers" are library functions that invoke the actual system calls and copy the contents of buffers between the protected and unprotected regions in a way that is transparent to the Secure Object software while allowing the Secure Object to communicate intelligibly with remote systems.

In addition to hiding some complexity from the programmer, the wrappers also allow us to convert existing software into Secure Object based software. This will be discussed in more detail in the discussion of FIG. 6.

FIG. 6 illustrates the process 600 of building Secure Object based software according to the alternative design discussed above. The shaded boxes in FIG. 6 show execution steps and unshaded boxes show calculated entities. A new or previously existing software program 601 is compiled 602 and linked 603 using existing tools and combined with the system call wrappers 605 discussed above. The software is also linked with a loader and an esm instruction 606 to form an initial executable binary, 604.

During execution, the loader referred to in the discussion of FIG. 2 will copy the encrypted code and data to an area in memory that will become the protected region and it will copy the hash tree, the communication buffers and the esm instruction to an area in memory that will become the unprotected region. The esm instruction 606 in the initial binary includes a placeholder for the esm operand which will be computed later in the build process. A randomly generated object key 607 is chosen and the Secure Object code and data is encrypted 608 under this object key 607. An initial hash tree that will be used at run-time to protect the integrity of the Secure Object code and data is computed 609 and encrypted 610. The object key 607, the root of the hash tree 612, and the bounds of the Secure Object's protected and unprotected regions are encrypted in 613 under the public key of the target system and this encrypted value is used as the operand 614 of the esm instruction. Then the encrypted binary 615, the esm operand 614, and the encrypted integrity tree 616 are combined to form the executable binary 617 shown in FIG. 2. This file 617 can be in a standard executable format such as ELF, which is then output in 618 by the build machine as a secure object.

One more comment about the hash tree. Since an executing program can grow in size at run-time by requesting additional memory from the operating system, the hash tree needs to be designed in such a way that it can accommodate this additional memory. This can be accomplished by using a sparse hash tree in which unused parts of the hash tree, i.e., hash tree nodes corresponding to unused portions of the address space, are not mapped to physical memory until they are actually used. If newly allocated memory is intiallized to zero and if the hash of newly allocated memory is also zero, the size of an executing program, and its hash tree, can be "grown" dynamically at run-time, without "breaking" an existing hash tree.

In a Linux-based environment, the Linux overcommit mechanism can be used to map pages of virtual memory corresponding to hash tree nodes to physical pages only when they are actually accessed. When the CPU attempts to access a memory location that has not been mapped to physical memory, a page fault is thrown.

This behavior is equivalent to how the CPU handles accesses to unmapped locations outside the integrity tree region. Since the virtual address has been reserved by the secure exectuable process (with the mmap syscall), the OS handles this fault by assigning a physical page to this location. The OS does not need to be aware of the location or size of the integrity tree region—this page allocation is the default OS behavior. With overcommit enabled, the secure executable can allocate address space for the entire potential integrity tree at startup, without generating an exception, even though the allocated address space will not necessarily fit in physical memory.

As discussed above, the root of the hash tree must be saved and/or restored in a process context switch. The root and several other values are saved and restored by the CPU hardware so that the operating system cannot access or tamper with these values. When an interrupt occurs, in addition to the root, the Secure Object's encryption key is saved (or encryption keys, if separate code and data keys are used, as discussed previously) as well as the contents of the general-purpose registers (GPRs). These are saved by the CPU hardware in a Secure Object Table on the CPU chip that is not accessible by software. Alternatively, the CPU can store these values in the protected portion of the Secure Object's address space.

The GPRs are also cleared before the interrupt handler is invoked so any sensitive information that was in the GPRs at the time of the interrupt is protected from the interrupt handlers, device drivers, and the operating system. The Object-ID of the interrupted Secure Object is also available in a register. The operating system will use this value later on to restore and run the interrupted Secure Object.

A new instruction, restorecontext, which has one operand, an Object-ID, restores a Secure Object's root, encryption key(s), and GPRs from the Secure Object Table (or alternatively from the protected portion of the Secure Object's address space discussed above) and resumes execution of the Secure Object. Another instruction, clearcontext, which also has an Object-ID operand, is used by the operating system when a Secure Object exits to clear and free an entry in the Secure Object Table so that that entry can be (re)used by another Secure Object.

To allow for a large number of concurrently-executing Secure Objects, entries in the on-chip Secure Object Table can be encrypted and moved to memory and later on moved back from memory to the on-chip Secure Object Table and decrypted. These operations would be done via two new instructions, SaveSOTentry and RestoreSOTentry, using keys that are known only by the CPU hardware.

Figure 7:
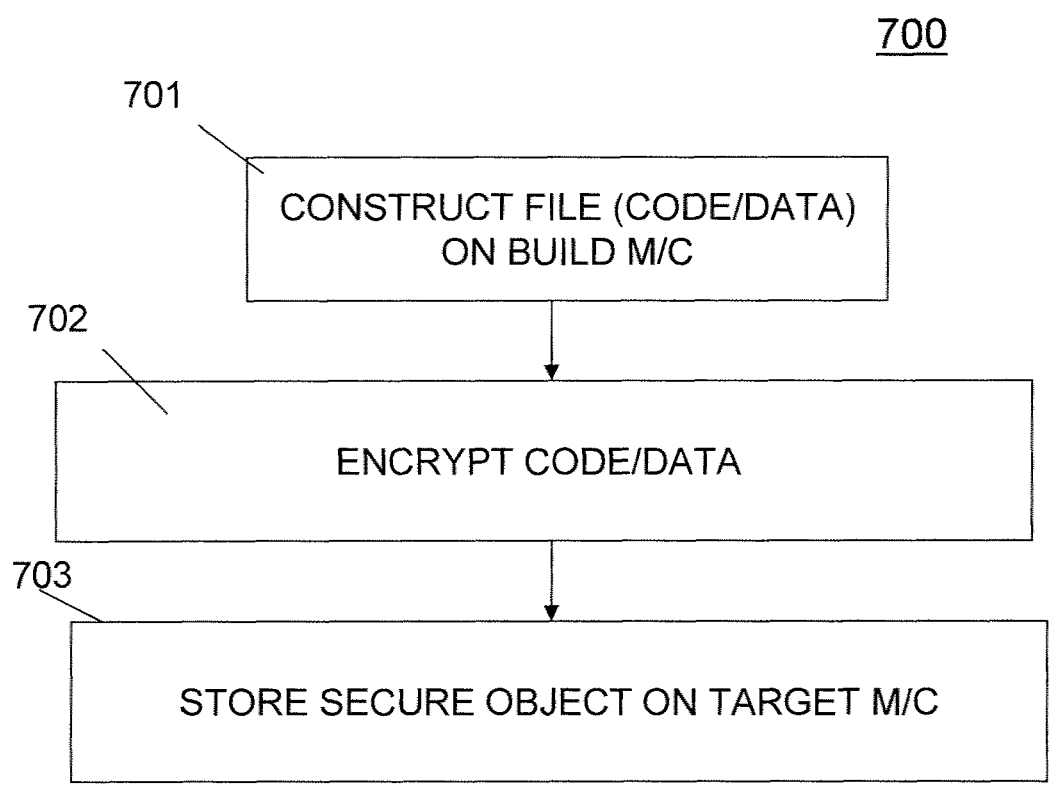
FIG. 7 shows in a simple flowchart format 700 the general concepts of the present invention.
Figure 8:
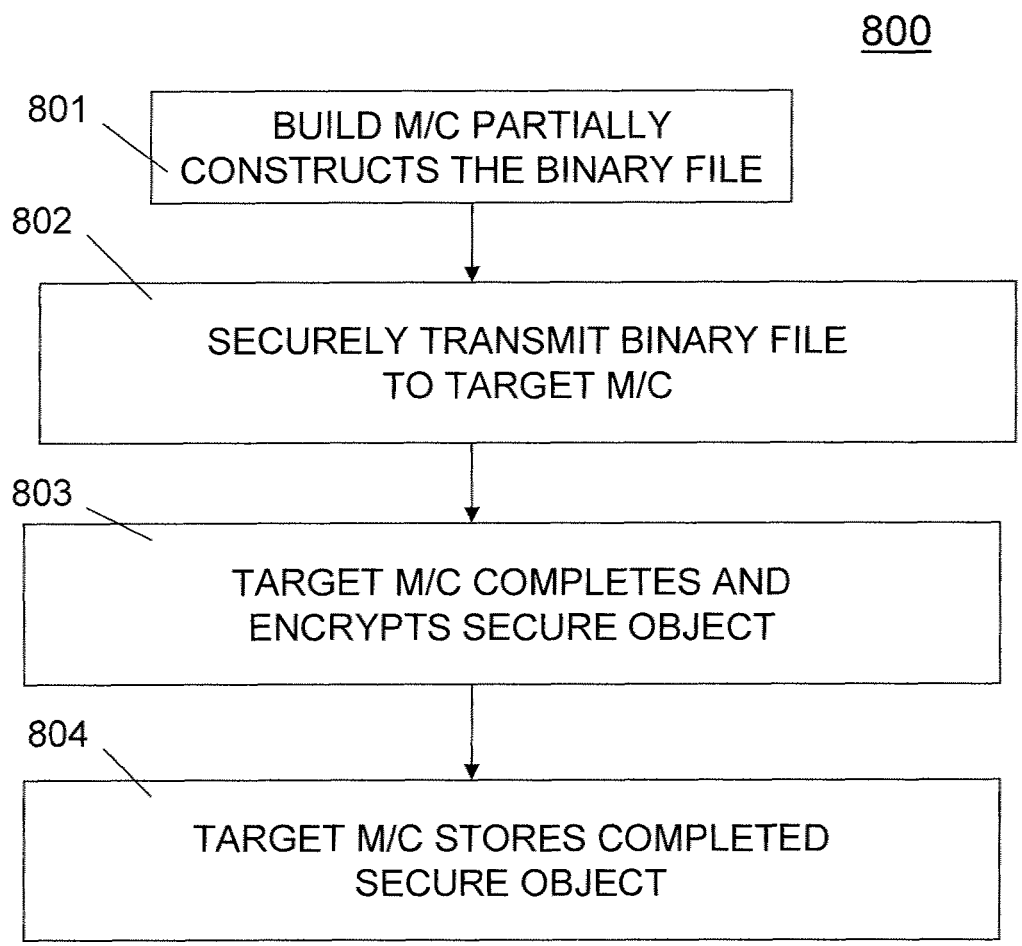
FIG. 8 shows in a simple flowchart format 800 how the first exemplary embodiment is exemplarily implemented.
Figure 9:
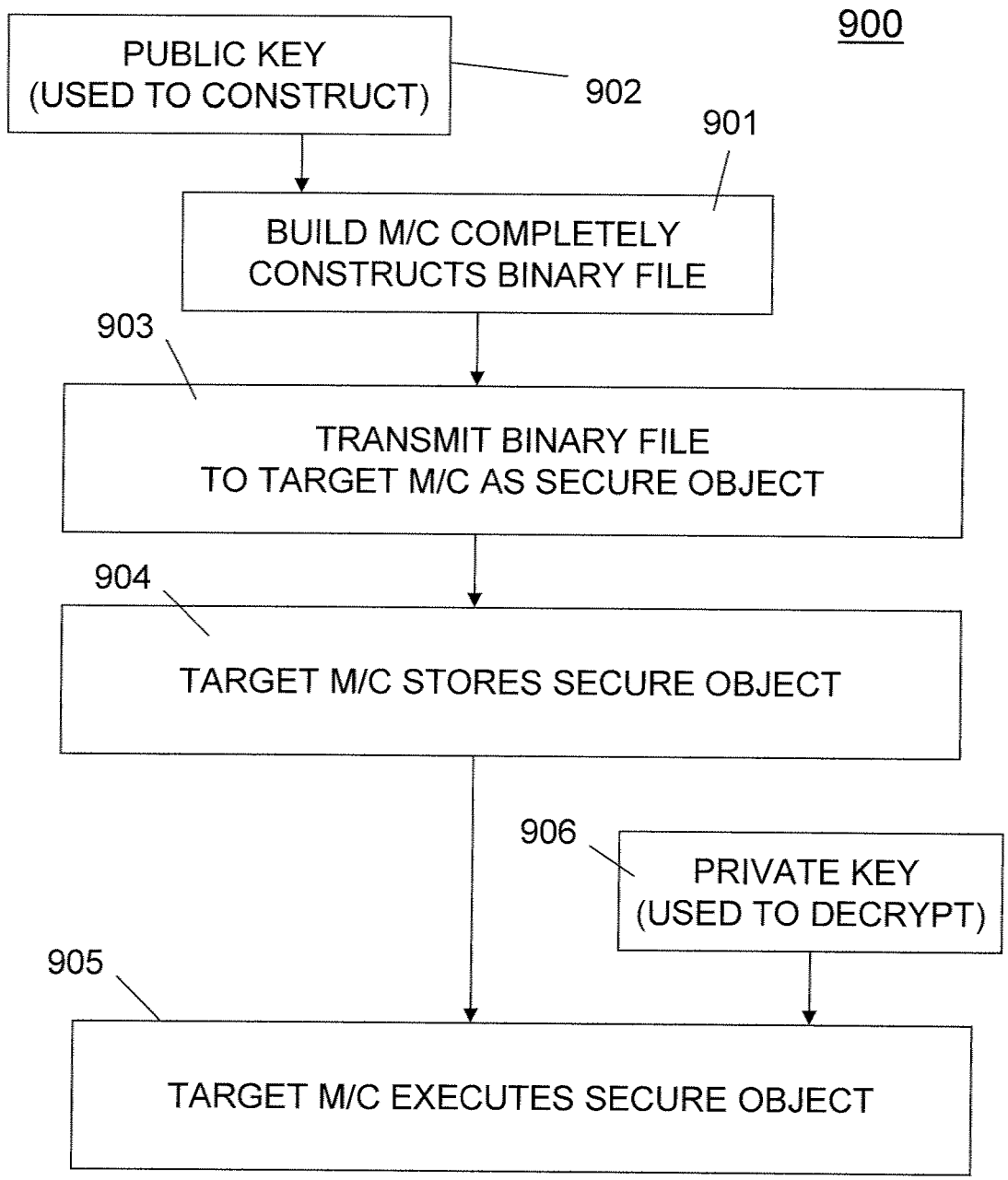
FIG. 9 shows in a simple flowchart format 900 how the second exemplary embodiment is exemplarily implemented.

To summarize the above-described methods, FIGS. 7-9 show in simple flowchart formats the steps of the exemplary embodiments, including the generic process 700 shown in FIG. 7. In step 701 of FIG. 7, the build machine constructs a binary file including code and/or data, which is then encrypted in step 702, and stored, in step 703 as a secure object by the target machine. A key feature of the present invention is that the build machine does not need to know the system key of the target machine.

FIG. 8 shows a simple flowchart 800 of the first exemplary embodiment in which the build machine only partially constructs the binary file in step 801, which partial binary file is then securely transmitted to the target machine in step 802. In step 803, the target machine then completes construction by encrypting the partially-constructed secure object, using its system key, and, in step 804, stores the secure object.

FIG. 9 shows a simple flowchart 900 of the second exemplary embodiment, in which the build machine, in step 901, uses the public key 902 of the target machine to completely construct the binary file, which is then transmitted to the target machine in step 903, and the target machine then stores, in step 904 the completed secure object that has been encrypted using the target machine's public key.

The target machine can then retrieve the stored secure object and execute it, in step 905, using the private key 906 of the target machine's public/private key pair as the system key to decrypt the esm operand of the secure object.

Thus, under either the first or second exemplary embodiments, a build machine can construct and transmit a secure object to a target machine without any knowledge of the target machine's system key.

Exemplary Hardware Implementation

Figures 10, 11:
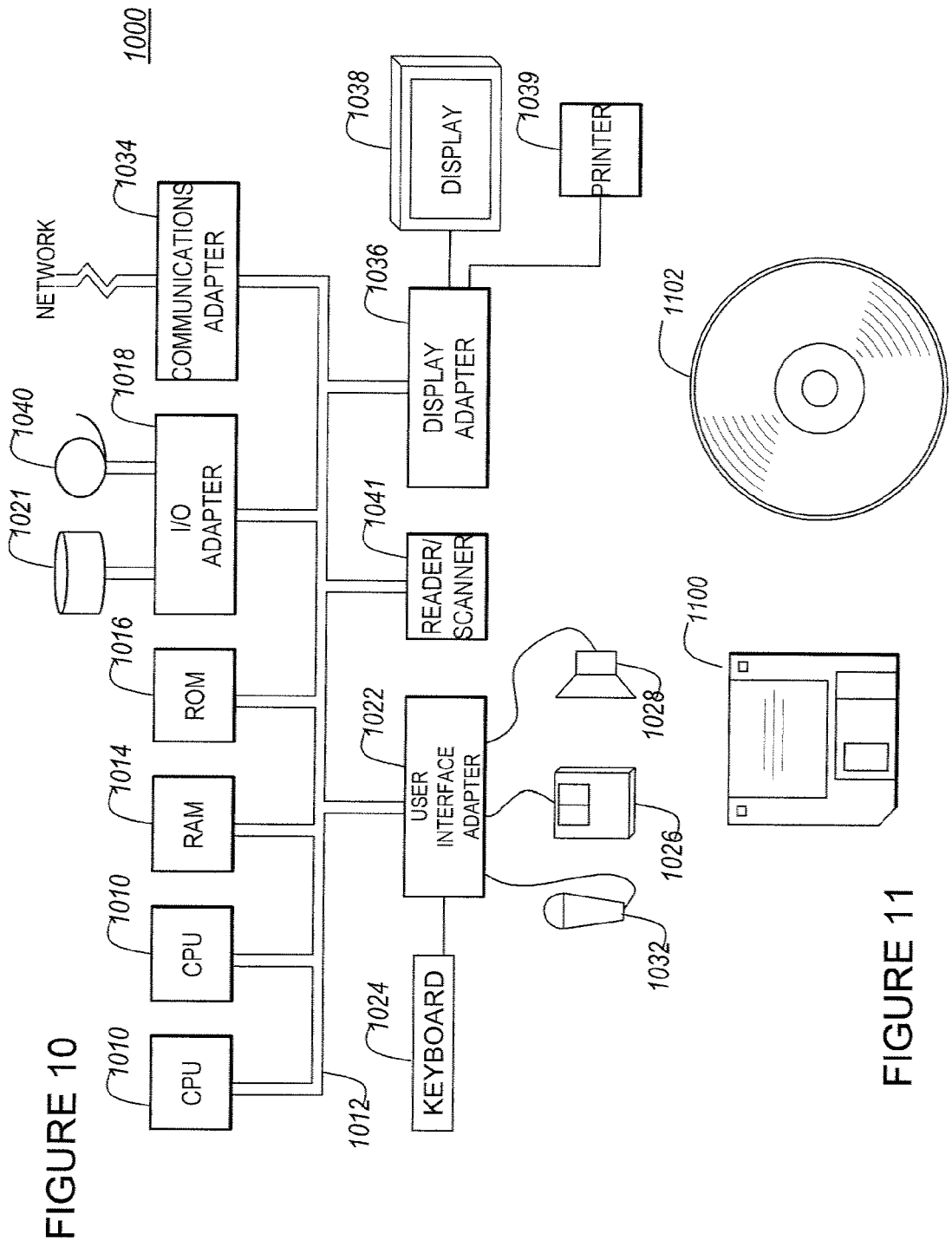
FIG. 10 shows an exemplary computer system 1000 that can be used to implement the concepts of the present invention, as modified to incorporate the hardware and/or software described herein.
FIG. 11 exemplarily shows a computer-readable memory device that can be used to store the concepts of the present invention, as embodied in computer-readable instructions for execution on a computer.

FIG. 10 illustrates a typical hardware configuration of an information handling/computer system in accordance with the invention and which preferably has at least one processor or central processing unit (CPU) 1010.

The CPUs 1010 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communication adapter 1034 for connecting an information handling system to a data processing network, the Internet, an Intranet, a personal area network (PAN), etc., and a display adapter 1036 for connecting the bus 1012 to a display device 1038 and/or printer 1039 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1010 and hardware above, to perform the method of the invention.

This signal-bearing media may include, for example, a RAM contained within the CPU 1010, as represented by the fast-access storage for example. Alternatively, the instructions may be contained in another signal-bearing media, such as a magnetic data storage diskette 1100 (FIG. 11), directly or indirectly accessible by the CPU 1010.

Whether contained in the diskette 1100, the computer/CPU 1010, or elsewhere, the instructions may be stored on a variety of non-transitory machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM 1102, WORM, DVD, digital optical tape, etc.), paper "punch" cards, or other suitable non-transitory signal-bearing storage media including storage devices in transmission media, communication links, and wireless, and including such formats as digital and analog. In an illustrative embodiment of the invention, the machine-readable instructions may comprise software object code.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure By Letters Patent is as follows:

1. A method of enhancing protection for at least one of software and data being executed on a computer, said method comprising:
    constructing, using a processor on a build machine, a file to comprise a secure object to execute on a target machine different from said build machine, said secure object comprising at least one of code and data that is always encrypted whenever said secure object is stored in a memory or on a disk on said target machine, said target machine being configured such that the encrypted stored secure object is in decrypted form on said target machine only when information of the secure object is inside a processor of said target machine during an execution of the secure object by said target machine after retrieval from a memory on said target machine, the decryption using a system key of the target machine that is available to the processor of the target machine but protected from software on the target machine, the target machine then encrypting information of the secure object as that information moves from the processor to the memory or disk; and
    storing said secure object, upon completion of construction, in an encrypted state as a completed secure object on said target machine,
    wherein said secure object is completed without said build machine having the system key of said target machine.

2. The method of claim 1, wherein said file for the secure object is constructed on said build machine except for a portion of said file that requires the target machine system key for completion of the secure object, said method further comprising:
    transmitting, using a secured communication, the incomplete secure object under construction from said build machine to said target machine for completion;
    completing construction of said secure object in said target machine, wherein said target machine then encrypts a portion of the secure object; and
    storing the processed secure object on the target system.

3. The method of claim 1, wherein said target machine is securely associated with a public key pair comprising a public key and a private key, said method further comprising:
    said target machine using the private key of the public key pair as said system key;
    said build machine using said public key in building said secure object; and
    said build machine transmitting said completed secure object to said target machine,
    wherein said target machine can execute said secure object using said private key in said decryption.

4. The method of claim 1, wherein said constructing on said build machine occurs in a secure environment.

5. The method of claim 1, wherein said file to comprise said secure object comprises:
    at least one of secure object code and secure object data;
    an initial version of an integrity tree that will protect an integrity of said secure object during an execution on said target machine; and
    an esm (Enter Secure Mode) instruction to enter into secure mode during said execution, the esm instruction comprising a CPU instruction that:
        decrypts an encrypted operand using said system key to obtain a second key that is used to decrypt said secure object as information from said secure object moves from memory into the CPU;
        encrypt information from said secure object as said secure object moves from the CPU to memory; and
        obtains an initial root of said integrity tree.

6. The method of claim 5, wherein said integrity tree comprises a hash tree having a hash tree root that is stored in a protected region of said target machine during said execution of said secure object on said target machine, said integrity tree ensuring that no tampering occurs of said secure object without detection.

7. The method of claim 6, wherein said hash tree comprises a plurality of layers of hash values, each said layer protected by a higher hash value layer, culminating in a final layer comprising a value in said hash tree root.

8. The method of claim 7, wherein a bottom layer of said hash tree is directed to a cache line size chunk of said secure object.

9. The method of claim 5, wherein separate hash trees are used for code of a secure object and for data of the secure object.

10. The method of claim 5, wherein a hash tree constructed during said building of said secure object comprises a sparse hash tree structure so that unused portions of the hash tree are not allocated memory until they are used to protect dynamically allocated portions of said secure object during an execution of said secure object on said target machine.

11. The method of claim 1, wherein said method further comprises a use of library functions, said library functions used to invoke system calls, copying contents of buffers between protected and unprotected regions so that the secure object software does not need to know about the protected and unprotected regions.

12. The method of claim 1, as tangibly embodied on a non-transitory computer-readable memory storing a program of computer-executable instructions for the method.

13. The method of claim 2 wherein said target machine includes a deployment server process which is itself a secure object that protects a security of said incomplete secure object transmitted from said build machine and completes construction of said secure object.

14. The method of claim 12, wherein said non-transitory computer-readable memory comprises one of:

a memory device on a computer serving as said build machine;

a memory device on a computer on a network storing said instructions to be downloaded onto another computer attached to said network; and a standalone memory device intended to be inserted into a drive compartment of a computer intended to serve as said build machine.

15. The method of claim 13, wherein said deployment server process uses at least one of digital certificates and public keys to validate a digital signature on any received software to ensure that said software is from a legitimate trusted party.

16. An apparatus serving as a build machine for a secure object, said apparatus comprising:

a processor for constructing a file to comprise a secure object to execute on a target machine different from said build machine, wherein said secure object comprises at least one of code and data that is to be always encrypted when said secure object is stored on said target machine, the encrypted stored secure object to be decrypted by said target machine only after retrieval from a memory on said target machine for execution by a processor on said target machine, the decryption using a system key of the target machine that is available to the processor but protected from other software on the target machine, said target machine configured to encrypt information of the secure object as that information moves from the processor back to said memory for storage, wherein said secure object is stored on said target machine, upon completion of construction, in an encrypted state as a completed secure object, and wherein said secure object is completed without said build machine having the system key of said target machine.

17. The apparatus of claim 16, wherein said file for the secure object is constructed on said build machine except for a portion of said file that requires the target machine system key for completion of the secure object, said apparatus further comprising:

a transmission interface, for transmitting using a secured communication, the incomplete secure object under construction from said build machine to said target machine for completion by said target machine.

18. The apparatus of claim 16, wherein said target machine has a public key pair comprising a public key and a private key, said apparatus serving as said build machine using said public key in building said secure object, said build machine then transmitting said completed secure object to said target machine, and wherein said target machine can thereinafter execute said secure object using said private key in decrypting said secure object during an execution thereof.

19. An apparatus, serving as a target machine for executing a secure object constructed as a file by a build machine different from said target machine, said apparatus comprising:

a processor to execute said secure object constructed on said build machine, said apparatus thereby serving as said target machine; and a memory to store said secure object in an encrypted format, wherein:

said secure object comprises at least one of code and data that is to be always encrypted whenever said secure object is stored in said memory on said target machine, the encrypted stored secure object to be decrypted by said target machine only when executed by the processor on said target machine after retrieval from the memory on said target machine, using a system key of the target machine for the decrypting, said target machine is configured to decrypt information in said encrypted stored secure object upon retrieval from said memory of said target machine for execution by the processor on said target machine and configured to encrypt information of said secure object as that information moves from the processor back to said memory, storing said secure object, upon completion of construction, in an encrypted state as a completed secure object on said target machine, and said secure object is completed without said build machine having the system key of said target machine.

20. The apparatus of claim 19, wherein:

said file for the secure object is constructed on said build machine except for a portion of said file that requires the target machine system key for completion of the secure object, the incomplete secure object under construction is thereinafter transmitted from said build machine to said target machine for completion, said target machine completes construction of said secure object in said target machine, said target machine then encrypting a portion of the secure object using its system key, and said target machine then stores the processed secure object on the target system.

21. The apparatus of claim 19, as having a public key pair comprising a public key and a private key, wherein:

said target machine uses the private key of the public key pair as said system key, said build machine uses said public key in building said secure object, said build machine then transmits said completed secure object to said target machine, and said target machine can execute said secure object using said private key in said decryption as said system key.

22. The apparatus of claim 19, wherein said secure object comprises a file comprising:

at least one of secure object code and secure object data;

an integrity tree that will protect an integrity of said secure object during an execution on said target machine, said integrity tree comprising a hash tree having a hash tree root, said integrity tree ensuring that no tampering occurs of said secure object without detection, said hash tree comprising a plurality of layers of hash values, each said layer protected by a higher hash value layer, culminating in a final layer comprising a value in said hash tree root; and an esm (Enter Secure Mode) instruction to enter into secure mode during said execution, the esm instruction comprising a Central Processing Unit (CPU) instruction that:

decrypts an encrypted operand using said system key to obtain a second key that is used to decrypt said secure object as information from said secure object moves from memory into a CPU;

encrypt information from said secure object as said secure object moves from the CPU to memory; and obtains an initial root of said integrity tree, wherein said apparatus further comprises:

a protected region of said apparatus, including a secure object table on a CPU chip of said processor, to store said hash tree root during an execution of said secure object.

* * * * *